Sept. 7, 1965  H. STRASSER ETAL  3,204,542
CAMERA WITH BUILT-IN FLASH APPARATUS
Filed Jan. 30, 1963  4 Sheets-Sheet 1
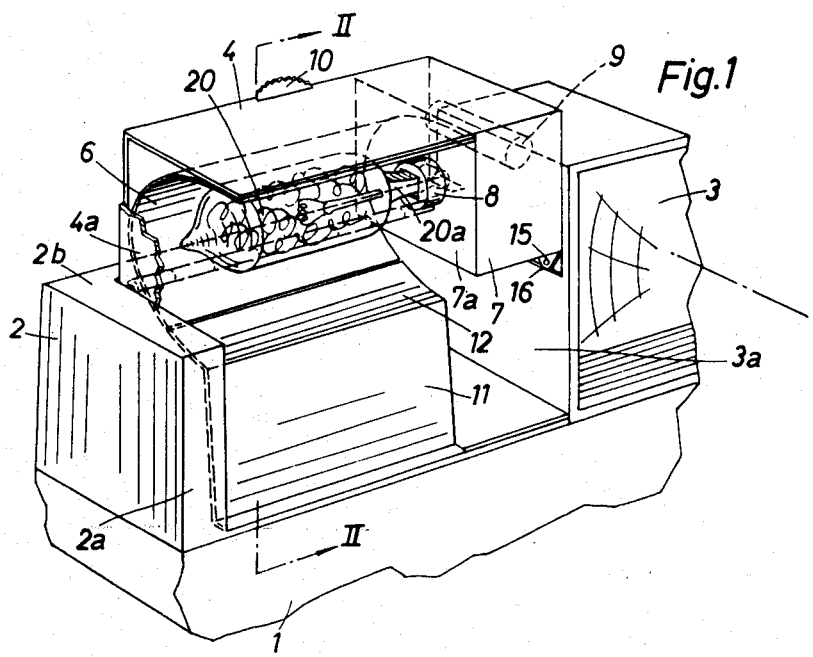
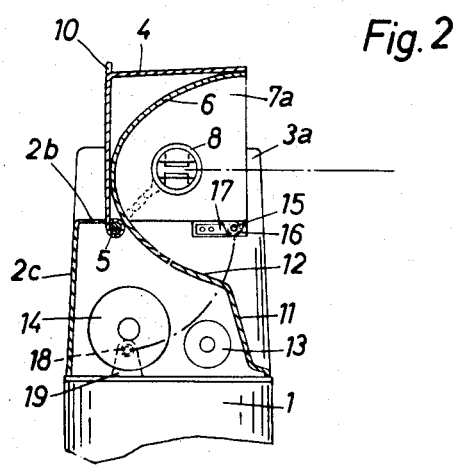
INVENTOR.
HELMUT STRASSER
GERHARD SCHUCHARD
HEINRICH TOPEL
OTFRIED RENNER
BY
Michael S. Striker
Attorney Sept. 7, 1965 H. STRASSER ETAL 3,204,542
CAMERA WITH BUILT-IN FLASH APPARATUS
Filed Jan. 30, 1963 4 Sheets-Sheet 2
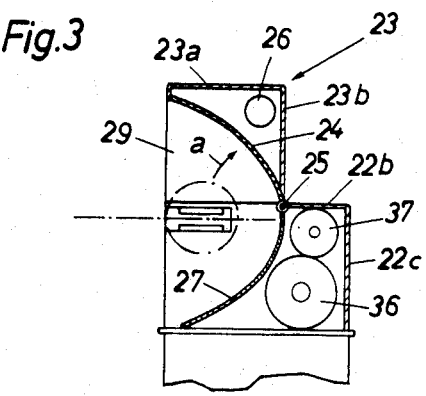
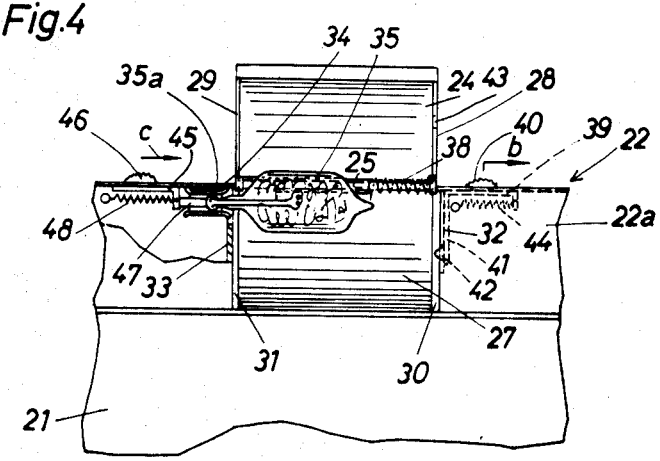
INVENTOR.
HELMUT STRASSER
GERHARD SCHUCHARD
HEINRICH TOPEL
OTFRIED RENNER
BY
MICHAEL S. STRIKER, ATTORNEY

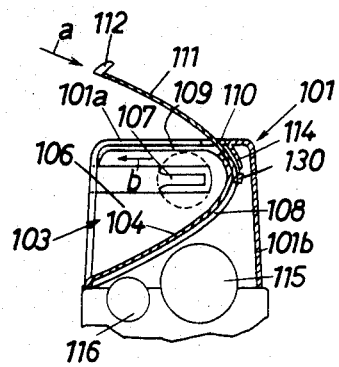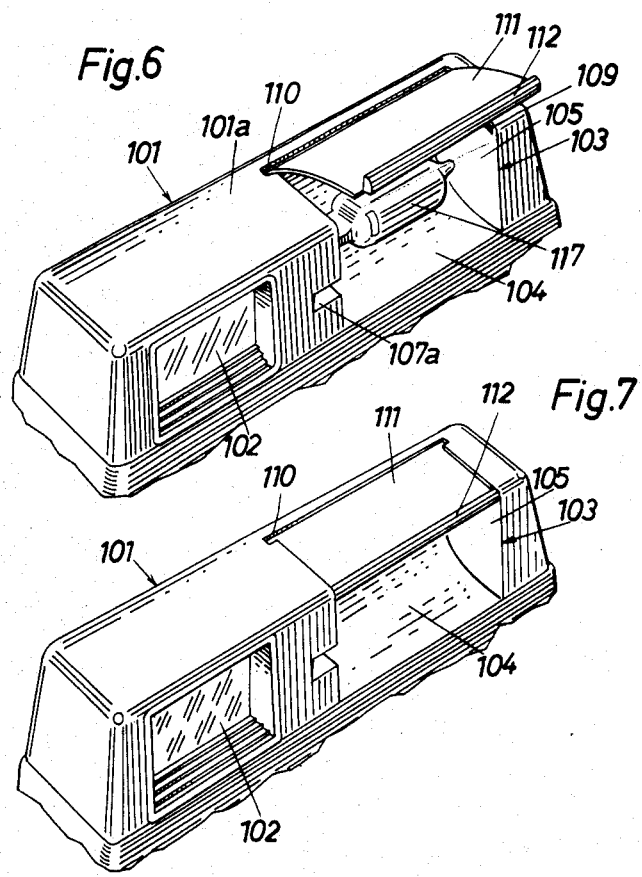

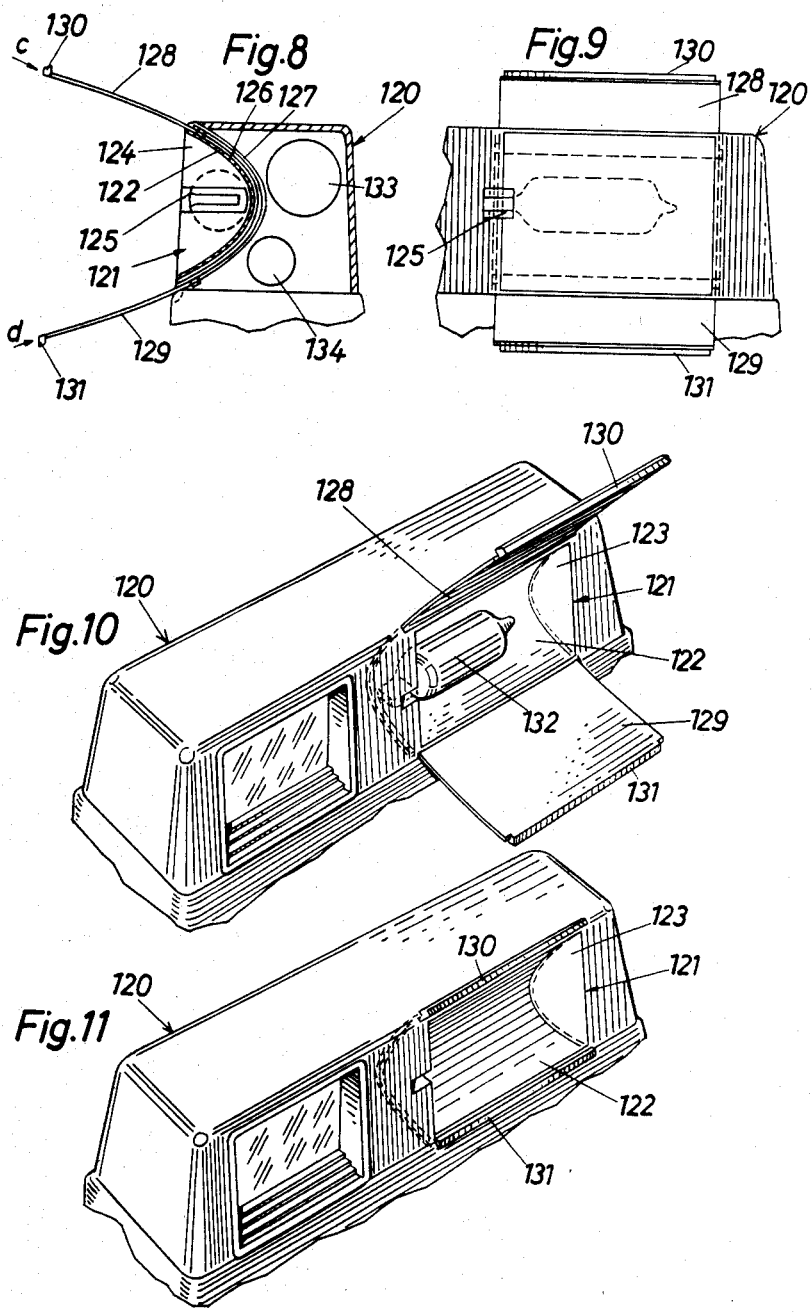

United States Patent Office 3,204,542
Patented Sept. 7, 1965

3,204,542
CAMERA WITH BUILT-IN FLASH APPARATUS
Helmut Strasser, Munich-Solln, and Gerhard Schuchard, Heinrich Topel, and Otfried Renner, Munich, Germany, assignors to Agfa Aktiengesellschaft, Leverkusen, Germany
Filed Jan. 30, 1963, Ser. No. 254,876
Claims priority, application Germany, May 17, 1962, A 18,319
26 Claims. (Cl. 95—11)

The present invention relates to cameras.

More particularly, the present invention relates to flash apparatus for cameras and especially to flash apparatus which is permanently built into a camera.

Conventional apparatus of this type undesirably increases the size of the camera and moreover requires the reflector for the flash lamp to be exposed and to have a size and shape which is not ideal. The exposed and unprotected reflector of such conventional structures also presents serious disadvantages.

It is accordingly a primary object of the present invention to provide a camera with a built-in flash apparatus which avoids the above drawbacks.

Another object of the present invention is to provide a camera with a built-in flash apparatus which, when not in use, does not undesirably increase the size of the camera and which at the same time remains protected with the reflector at least substantially unexposed.

It is furthermore an object of the present invention to provide a camera with a flash apparatus which, during use, includes a reflector of a sufficient size and high optical quality to provide optimum operating conditions even though, when the flash apparatus is not in use, this flash apparatus does not extend beyond the remainder of the camera structure.

An additional object of the present invention is to distribute the elements of the flash apparatus, which is built into the camera, in such a way that the use is made of space which normally would remain unoccupied, so that the size of the camera need not be undesirably increased because it is provided with a built-in flash apparatus.

Also, it is an object of the present invention to provide a camera with a flash apparatus which is simple and inexpensive while at the same time being easy to operate and maintain.

With these objects in view, the invention includes, in a camera, an exterior wall means defining the exterior surface of the camera and a flash apparatus built into the camera and carried by this exterior wall means thereof. The flash apparatus of the invention includes a fixed reflector element which is located within the confines of the exterior surface defined by the exterior wall means of the camera, and the flash apparatus also includes a movable reflector element which is carried by the exterior wall means of the camera for movement between a collapsed position, where the movable reflector element is also located within the confines of the exterior surface of the camera, and an expanded position where the movable reflector element extends beyond the exterior surface defined by the exterior wall means of the camera and forms an extension of the fixed reflector element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective illustration of one possible embodiment of a camera with a built-in flash apparatus according to the invention, the structure being shown in FIG. 1 in its operative condition;

FIG. 2 is a sectional elevation taken along line II—II of FIG. 1 in the direction of the arrows;

FIG. 3 is a sectional elevation of another embodiment of a flash apparatus built into a camera, in accordance with the present invention;

FIG. 4 shows the structure of FIG. 3 as seen from the left of FIG. 3 with the camera structure located at opposite sides and below the reflector of the flash apparatus being illustrated fragmentarily in FIG. 4;

FIG. 5 is a sectional elevation of still another embodiment of a flash apparatus built into a camera;

FIG. 6 is a perspective illustration of a camera provided with the structure shown in FIG. 5;

FIG. 7 illustrates the structure of FIG. 6 with the movable reflector element of FIG. 6 shown in its collapsed condition;

FIG. 8 is a sectional elevation of still another embodiment of a flash apparatus built into a camera, in accordance with the present invention;

FIG. 9 is a view of the structure of FIG. 8 as seen from the left of FIG. 8, and FIG. 9 shows also, fragmentarily, the camera structure located at opposite sides of the reflector structure;

FIG. 10 is a perspective illustration of the structure of FIGS. 8 and 9 with the adjoining camera structure; and FIG. 11 shows the structure of FIG. 10 with the reflector elements in their collapsed condition.

Referring now to FIGS. 1 and 2, there is fragmentarily illustrated therein a camera housing 1 which has a top wall carrying a hollow enclosure 2 which defines with the upper wall of the camera housing 1 a chamber which is adapted to contain structure such as the viewfinder 3, fragmentarily illustrated in FIG. 1.

The enclosure 2 includes a front wall 2a and a top wall 2b, and adjoining portions of the walls 2a and 2b form a section 4 of the enclosure 2 which is separate from the remainder of the closure 2. While the enclosure 2 may extend over the entire top wall of the housing 1 to define therewith a chamber which is adapted to contain a unit such as the viewfinder 3, in the particular example illustrated in FIGS. 1 and 2 the viewfinder 3 forms a separate unit carried by the top wall of the housing 1 and having a wall 3a which forms an end wall of the enclosure 2. The section 4 extends all the way up to the end wall 3a, and a connecting means connects the section 4 to the remainder of the enclosure 2 for movement between the expanded position illustrated in FIGS. 1 and 2 and a collapsed position where the section 4 forms a continuation of the remainder of the enclosure 2, so that in its collapsed position the section 4 will form continuations of walls 2a and 2b. In the illustrated example the connecting means takes the form of a hinge structure 5 located along the rear edge of the wall portion of the wall 2b which forms part of the section 4, and this hinge structure 5 connects the section 4 to the remainder of the enclosure 2 for turning movement through an angle of approximately 90° between the position shown in FIGS. 1 and 2 and the collapsed position described above. Thus, the rear edge of the portion of the wall 2b which forms part of the section 4 may be provided with a series of spaced tubular portions which are respectively located between and alternate with spaced tubular portions of the rear part of the wall 2b at the edge thereof located next to the section 4, and these tubular sections alternate with each other and are in coaxial alignment so as to receive an elongated hinge pin which is tubular so that an elongated hollow tubular hinge pin is provided for a purpose described below.

The flash apparatus which is built into the camera includes a movable reflector element 6 which is fixedly carried by the section 4 for turning movement therewith, and at its right end, as viewed in FIG. 1, the section 4, fixedly carries a hollow housing 7 which also moves with the section 4 and which forms a support means for structure of the flash apparatus, as described below. The support means or housing 7 carries at its wall 7a which is located at one end of the movable reflector element 6, a lamp socket 8 which is adapted to receive the base 20a of a flash lamp 20, the structure of the socket 8 and the flash lamp being conventional and well known in the art. The section 4 is provided with an end wall 4a at the end of the removable reflector element 6 opposite from the wall 7a of the housing 7, and the wall 4a is also turnable with the section 4, and the walls 4a and 7a which are respectively located at the ends of the elongated reflector element 6 are shiny and highly reflecting at their inner surfaces which are directed toward each other. The housing 7 also forms a support means which carries, in addition to the lamp socket 8, electrical structure of the flash apparatus such as the resistor 9. The section 4 is provided with a small handle element 10 which is accessible to the operator to facilitate the turning of the section 4 between its expanded and collapsed positions, and of course when the camera is carried about and not in use the section 4 will be in its collapsed position described above.

The flash apparatus also includes a fixed reflector element 12 which is carried by a stationary wall 11 fixed at its bottom edge, for example, to the top wall of the camera housing 1, and it will be noted that the wall 11 and stationary reflector element 12 are located within the chamber defined between the enclosure 2 and the upper wall of the camera housing 1. In the expanded position of the enclosure section 4 and the movable reflector element 6, this latter reflector element 6 forms an extension of the stationary reflector element 12, as is particularly apparent from FIGS. 1 and 2, and it will be noted that the reflector means 6, 12 is of an elongated, channel-shaped configuration having a substantially parabolic cross section. It will be seen that with this structure the enclosure 2 together with the camera housing 1 include an exterior wall means which defines the exterior surface of the camera, and when the section 4 of the enclosure 2 is in its collapsed position the reflector means 6, 12 does not extend beyond the exterior surface defined by the wall means of the camera, while in the expanded position of the reflector means 6, 12, the movable reflector element 6 extends beyond the exterior surface defined by the exterior wall means of the camera and forms an extension of the stationary reflector element 12.

As is apparent particularly from FIG. 2, the wall 11 together with the fixed reflector element 12 are spaced forwardly from the rear wall 2c of the enclosure 2, and thus this reflector element 12 together with the wall 11 define with the rear wall 2c of the enclosure 2 a space, and components of the electrical structure of the flash assembly are located within this space. Thus, as is diagrammatically illustrated in FIG. 2, a condenser 13 and a battery 14 which are accommodated within this space form components of the flash apparatus. The electrical leads which interconnect the various elements of the flash apparatus to provide the necessary electrical circuit are not illustrated, but the leads which interconnect the battery 14 and condenser 13 with the resistor 9 extend through the hollow hinge pin of the connecting means 5 on the one hand into the interior of the housing 7 to be connected to the resistor 9 and on the other hand into the space between the rear wall 2c of the enclosure 2 and the reflector element 12 to be connected with the battery 14 and the condenser 13. Of course, the electrical connection is also made in this way with the lamp socket 8. The rear wall 2c may be provided with a flap which is, for example, hingedly connected to the remainder of the rear wall 2c and which may be turned by the operator to an open position giving access to the battery 14 and the condenser 13, and such a flap is normally maintained in its closed position in any suitable way so as to close the space in which the elements 13 and 14 are located.

A releasable holding means is provided for releasably holding the section 4 of the enclosure 2 in its expanded and collapsed positions, and for this purpose the housing 7 is provided with an extension 16 which is fixed to the housing 7 and which is formed with an opening 15. In the operating condition of the flash apparatus, which is shown in FIGS. 1 and 2, this opening 15 of the extension 16 receives a projection located at one end of a leaf spring 17 which urges this projection into the opening 15, and the wall 3a is formed with an elongated groove in which the leaf spring 17 is mounted with the projection at the end thereof resiliently entering into the opening 15 when the operator raises the section 4 to the position illustrated in FIGS. 1 and 2. The operator need only press the section 4 lightly in a clockwise direction, as viewed in FIG. 2, so as to cause the extension 16 to move away from the projection of the leaf spring 17 and when the section 4 is in its collapsed position forming extensions of the walls 2a and 2b, as described above, a projection 18 of a leaf spring 19, which is fixedly carried by the upper wall of the camera housing 1, enters into the opening 15 to releasably hold the section 4 in its collapsed position. It will be noted that there is located between the wall 11 and reflector section 12, on the one hand, and the wall 3a, on the other hand, a space which is sufficient to provide for free movement of the housing 7, and in the same way there is provided at the left end of the reflector element 12 and the wall 11, as viewed in FIG. 1, a free space for accommodating the end wall 4a of the section 4.

In the embodiment of the invention which is illustrated in FIGS. 3 and 4, the upper wall of the camera housing 21 also carries a hollow elongated enclosure 22, which in this case extends along the entire length of the camera, and this enclosure 22 of course defines with the upper wall of the camera housing 1 a chamber in which a unit such as a viewfinder is adapted to be located. The elongated enclosure 22 includes a front wall 22a, a top wall 22b, and a rear wall 22c, and portions of the front and top walls of the enclosure 22, which adjoin each other, form a section 23 of the enclosure 22 which is separate from the remainder of the enclosure 22. A connecting means, in the form of the hinge 25, which may have the same structure as that described above in connection with the hinge 5, connects the enclosure section 23 to the remainder of the enclosure 22 for movement with respect thereto between the expanded position illustrated in FIGS. 3 and 4 and a collapsed position where the walls 23a and 23b of the section 23 respectively form extensions of the walls 22a and 22b, these walls 23a and 23b actually being portions of the walls 22a and 22b, respectively. At its interior, the enclosure section 23 fixedly carries a reflector element 24 which is thus movable together with the enclosure section 23. It will be noted that the reflector element 24 defines with the walls 23a and 23b a predetermined space, and in this space there is accommodated electrical structure of the flash apparatus, such as, for example, the resistor 26 diagrammatically illustrated in FIG. 3. The connecting means 25 includes an elongated hollow hinge pin, as described above in connection with FIGS. 1 and 2, and electrical leads from the resistor 26 can extend through this hollow hinge pin to be connected with additional electrical structure of the flash apparatus, as described below.

Within the chamber which is defined between the enclosure 22 and the upper wall of the camera housing 21 is located a fixed reflector element 27 which is fixed at its top and bottom edges to the top wall 22b of the enclosure 22 and to the top wall of the camera housing 21, respectively, and it will be noted that in the expanded position of the movable reflector element 24, this reflector element forms an extension of the stationary reflector element 27 and defines therewith an elongated, channel-shaped reflector of substantially parabolic cross section. The section 23 fixedly carries end walls 28 and 29 which are respectively located at the ends of the movable reflector element 24 and which have shiny surfaces directed toward each other. Within the enclosure 22, the top wall of the camera housing 21 carries a pair of transverse walls 32 and 33 which are located respectively adjacent to but spaced slightly from the ends of the fixed reflector element 27 so as to define therewith a pair of gaps 30 and 31 through which the walls 28 and 29 are respectively freely movable during turning of the section 23 between its collapsed and expanded positions. The transverse wall 33 carries a lamp socket 34 of the flash apparatus, and it will be noted that this lamp socket is exposed when the section 23 is turned to its expanded position. The lamp socket 34 is adapted to receive, in a manner well known in the art, the base 35a of a flash lamp 35.

With the embodiment of FIGS. 3 and 4, the fixed reflector element 27 is also located forwardly of the rear wall 22c of the enclosure 22 to define therewith a space which is adapted to accommodate electrical components of the flash apparatus, and there is diagrammatically indicated in FIG. 3 the battery 36 and the condenser 37 which are located within this space and which are electrically connected with the resistor 26 as well as with the socket 34 through unillustrated electrical conductors, in the manner well known in the art.

The embodiment of FIGS. 3 and 4 also includes a spring means for urging the enclosure section 23 and the movable reflector element 24 to their expanded position, and this spring means includes the spring 38 which is shown in FIG. 4. This, the spring 38 is coiled about an exposed portion of the hinge pin with one end of the spring 38 pressing against the reflector element 24 and the other end thereof pressing against the fixed reflector element 27 so that the spring 38 urges the reflector element 24 together with the section 23 to the illustrated expanded position. Thus, the spring 38 urges the section 23 and movable reflector element 24 in the direction of the arrow as shown in FIG. 3. It should be noted, as may be seen from FIG. 2, that the front edge of the part of the top wall 2b of the enclosure 2 which adjoins the movable section 4 forms a stop limiting the upward turning of the section 4, and in the same way the front edge of the top wall 22b of the enclosure 22, which adjoins the wall portion 23b forms a stop limiting the movement of the section 23 by the spring 38.

In order to hold the section 23 and movable reflector element 24 in their collapsed position, the enclosure 22 carries a releasable holding means made up of a shiftable element 39 which extends along the underside of the top wall 22b and has a handle 40 extending through a slot formed in the top wall 22b. This shiftable element 39 has an integral, downwardly directed extension 41 which carries at its free end portion a substantially conical projection 42, and this projection 42 extends through an opening of the transverse wall 32 into the gap 30 which receives the wall 28 when the section 23 is moved to its collapsed position. This wall 28 is formed with an opening 43 which receives the end of the conical projection 42 when the section 23 is in its collapsed position. The releaseable holding means includes in addition to the shiftable member 39 an elongated spring 44 connected at its left end, as viewed in FIG. 4 to a stationary element within the enclosure 22 and at its right end to a projection at the right end of the member 39 to urge the latter to the left, as viewed in FIG. 4, so that the projection 42 will automatically enter into the opening 43 when the operator turns the section 23 in opposition to the spring 38 to its collapsed position. The operator need only move the handle 40 in opposition to the spring 44 in the direction of the arrow b shown in FIG. 4, in order to displace the projection 42 out of the opening 43, so that the spring 38 will then automatically move the section 23 and the reflector element 24 to their expanded position illustrated in FIGS. 3 and 4.

The embodiment of FIGS. 3 and 4 also includes an ejector means which is manually operable and which is capable of ejecting a flash lamp 35 after it has been ignited. For this purpose the camera is provided at the underside of the top wall 22b of the enclosure 22 with an additional slide member 45 carrying a handle 46 which also extends to the exterior of the enclosure 22 through a slot formed in the top wall thereof. It should be noted that the handle 46 as well as the handle 40 are larger than, which is to say wider than, the slots through which the connecting elements between the handles and slide members respectively extend, so that these handles also serve to maintain the slide members 39 and 45 at the underside of the top wall 22b of the enclosure 22. The shiftable member 45 fixedly carries an ejector pin 47 which engages the base 35a of the lamp 35 in order to eject the latter. Also, a return spring 48 is operatively connected with the ejector member 45 to retract the latter to its left, rest position, as viewed in FIG. 4. In this position the ejector means does not engage the lamp or interfere in any way with the operation thereof.

After the handle 40 is moved in the direction of the arrow b so as to release the section 23 to the spring 38, in the manner described above, in order to automatically move the reflector element 24 to its expanded position where it forms an extension of the stationary reflector element 27, the lamp 35 can be inserted, at its base 35a, into the socket 34. After an exposure has been made, the operator will advance the handle 46 in the direction of the arrow c shown in FIG. 4 so that the ejector pin 47 will engage the base 35a of the lamp 35 and eject the latter from the socket 34. When it is desired to return the section 23 to its collapsed position, the operator simply turns the section 23 in a direction opposite to that indicated by the arrow a until the projection 42 again snaps into the opening 43 of the wall 28.

While a turning movement of the enclosure section and movable reflector element is preferred because of the simplicity of the hinge structure which is required for this purpose, it is also possible to provide a construction where the movable reflector element and section of the enclosure move through a combination of shifting and turning movements in order to be displaced between their expanded and collapsed positions.

In the embodiment of the invention which is illustrated in FIGS. 5–7, the upper wall of the camera housing also carries an elongated hollow enclosure member 101 which defines with the upper wall of the camera housing a chamber which is adapted to contain a unit such as the viewfinder 102. In this embodiment the wall means which defines the exterior surface of the camera is formed with an opening 103, and in this opening 103 is located a stationary reflector element 104. A pair of transverse walls 105 and 106 are fixedly carried by the enclosure 101 at the ends, respectively, of the stationary reflector element 104. The transverse wall 106 serves to carry the lamp socket 107 of the flash apparatus of the embodiment of FIGS. 5–7.

These transverse walls 105 and 106 extend to the rear of the reflector section 104 up to the rear wall 101b of the enclosure 101, and just to the rear of the reflector element 104 the walls 105 and 106 are respectively formed with a pair of grooves 108 (FIG. 5) which extend along the reflector element 104 in the manner shown most clearly in FIG. 5. Moreover, the transverse walls 105 and 106 are respectively formed with upper grooves 109 which extend along these walls adjacent to the top wall 101a of the enclosure 101, and it will be noted that these grooves 109 are located over the ends of the reflector element 104. At the place where each upper groove portion 109 adjoins each rear groove portion 108, each wall 105 and 106 is formed with a notch 110 extending all the way to the upper surface of the upper wall 101a of the enclosure 101.

The grooves 108 and 109 form a guide means for guiding a movable reflector element 111 which is in the form of a flexible sheet which may be made of steel, for example, and the side edges of the sheet 111 are respectively received slidably within the grooves 108, as well as the grooves 109 when the movable reflector element 111 is in its collapsed position shown in FIG. 7. At its front free edge which is accessible to the operator, the reflector element 111 fixedly carries a handle 112 which is accessible to the operator to facilitate grasping and moving the reflector element 111. At its rear edge the movable reflector element 111 carries a stop projection 130 which cooperates with a stop projection 114 carried by the top wall 101a of the enclosure 101 and extending downwardly therefrom in the manner indicated in FIG. 5, so that the engagement of the element 130 with the element 114 limits the movement of the reflector element 111 out of the grooves 108.

In the space which is defined between the stationary reflector element 104 and the rear wall 101b of the enclosure 101, as well as between the transverse walls 105 and 106, are located electrical components of the flash apparatus such as the battery 115 and the condenser 116, as well as unillustrated electrical leads, and also, if desired, the resistor which is located in the charging circuit of the condenser may also be accommodated in this space. In order to facilitate exchanging of the battery 115 the rear wall 101b can be provided with a flap turnable between closed and opened positions so as to give access to the space in which the battery 115 is located.

In the expanded position of the reflector element 111, shown in FIGS. 5 and 6, this reflector element 111 extends from the grooves 108 through the notches 110 beyond the confines of the exterior surface of the camera, this exterior surface being defined by the exterior wall means of the camera, as shown in FIG. 7, and the lamp socket 107 which is carried by the transverse wall 106 may receive a lamp which can have its base introduced through the elongated horizontal groove 107a formed in the wall 106. It will be noted that when the reflector element 111 is in its expanded position forming an extension of the stationary reflector element 104, these reflector elements cooperate to provide an elongated reflector of channel-shaped configuration and having a substantially parabolic cross section, and moreover when the lamp 117 is mounted within the socket 107, this lamp has its axis extending parallel to the elongated reflector. During normal use of the camera the elongated reflector 111, 104 and the lamp 117 will both extend horizontally.

In order to return the reflector element 111 to its collapsed position, in which it will be located when the camera is not in use and is being carried about, the operator engages the handle 112 and moves the sheet 111 inwardly along the grooves 108, in the direction of the arrow a shown in FIG. 5, and this movement will continue until the handle reaches the notches 110. It will be noted from FIG. 6 that the ends of the handle 112 do not extend all the way up to the side edges of the sheet 111, so that when the notches 110 are reached the operator may move the ends of the sheet 111 which extend beyond the handle 112 downwardly through the notches 110 in order to align these ends with the grooves 109, and then the operator can pull the handle 112 forwardly to advance the side edges of the sheet 111 along the grooves 109, and at this time the handle 112 will move forwardly while the sheet 111 moves out of the grooves 108 along the grooves 109 to the position illustrated in FIG. 7. At this time the handle 112 will be moved by the operator in the direction of the arrow b shown in FIG. 5. The structure is so constructed that when the movable reflector element 111 is in its collapsed position shown in FIG. 7 there still remains between the element 111 and the stationary reflector element 104 a space which is sufficiently large to accommodate the lamp 117, so that a lamp 117 may remain in the flash apparatus even when the reflector means thereof is in its collapsed position. It will also be noted that in the collapsed position of the reflector element 111, this reflector element does not extend beyond the confines of the exterior surface of the camera and moreover is located over the stationary reflector element 104 so as to protect the latter.

In order to move the reflector element 111 to its expanded position shown in FIGS. 5 and 6, when it is desired to make an exposure with flash illumination, the operator moves the handle 112 rearwardly until the front ends of the side edges of the flexible plate 111 reach the notches 110, and then the handle 112 is pulled forwardly and upwardly with the side edges of the sheet 111 passing through the notches 110 so that the element 111 can be advanced to the position shown in FIG. 5 within the limits provided by the stop means 113, 114, and now the reflector element 111 is in its expanded position forming with the stationary reflector element 104 a reflector for the flash apparatus of the invention.

According to the embodiment of the invention which is illustrated in FIGS. 8–11, the upper wall of the camera housing also carries an elongated hollow enclosure 120 which is formed with an opening 121. A fixed reflector element 122 is located in the opening 121 in the manner shown most clearly in FIGS. 8, 10 and 11. The enclosure 120 is fixed with a pair of transverse walls 121 and 122 which are located at the ends of the stationary reflector element 122 and which extend rearwardly to the rear wall of the enclosure 120. The transverse wall 124 carries a lamp socket 125 into which a lamp may be introduced through the horizontal slot shown in FIG. 8.

The stationary reflector element 122 is fixedly carried at its ends by the transverse walls 121 and 122, and it will be noted particularly from FIG. 8 that the upper and lower edges of the stationary reflector element 122 are respectively spaced from the front edge of the top wall of the enclosure 20 and from the front edge of the upper wall of the camera housing, so that in this way a pair of elongated slots extend along the upper and lower edges of the stationary reflector element 122, and a pair of movable reflector elements 128 and 129 are adapted to pass through these slots. Each of the side walls 121 and 122 is formed with a pair of guide grooves 126 and 127 whose configuration conforms to that of the reflector element 122 with the slots located just to the rear of the reflector element 122, as indicated in FIG. 8, and in this way the flash apparatus includes a guide means for the pair of movable reflector elements 128 and 129 which are in the form of flexible sheets of sheet metal, such as steel or the like, with the side edges of the sheet 128 slidably received within the groove 126 while the side edges of the sheet 129 are slidably received within the groove 127. These movable reflector elements 128 and 129 fixedly carry at their front edges elongated handle portions 130 and 131 to facilitate grasping and moving of the movable reflector elements 128 and 129. Moreover, the movable sheets 128 and 129 are provided at their rear edges with stop projections cooperating with stationary stop projections, in the manner described above in connection with FIG. 5, so that in this way the movement of the reflector elements 128 and 129 outwardly of the grooves 126 and 127, respectively, is limited. The reflector elements 128 and 129, as well as the reflector element 111, are provided with inner shiny surfaces so as to have good reflecting properties.

It will be noted that in the operative or expanded positions of the reflector elements 128 and 129 shown in FIGS. 8–10, these elements form extensions of the stationary reflector element 122 and define therewith an elongated, channel-shaped reflector of substantially parabolic cross section. The location of the socket 125 is such that the axis of the lamp 132 received in this socket extends parallel to the elongated reflector, so that when the camera is held horizontally the lamp 132 will also extend horizontally.

With the embodiment of FIGS. 8–11 there is also located between the rear wall of the enclosure 120 and the fixed reflector element 122 a space which is adapted to receive components of the flash apparatus such as battery 133 and the condenser 134 as well as additional elements of the flash apparatus. Also, the rear wall of the enclosure 120 may be provided with a turnable flap for giving access to the space in which the battery 133 and the condenser 134 are located.

In order to displace the reflector elements 128 and 129 from the position shown in FIGS. 8–10 inwardly to their collapsed positions, the operator simply moves the handles 130 and 131 in the direction of the arrows *c* and *d* shown in FIG. 8, until these reflector elements are located entirely within the confines of the exterior surface of the camera, as indicated in FIG. 11. In order to return the parts to their operating condition, the operator simply grasps the handles 130 and 131 and moves the reflector elements 128 and 129 in directions opposite to that indicated by the arrows *c* and *d* to the positions indicated in FIGS. 8–10. It will also be noted that with this embodiment the lamp 32 can be accommodated in the socket 125 even when the movable reflector elements 128 and 129 are in their collapsed positions.

It will be understood that each of the elements described above, or two or more together, may also find a useful application in other types of cameras differing from the types described above.

While the invention has been illustrated and described as embodied in flash apparatus for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing; front wall means determining the front surface of the camera and having a cutout; and a built-in flash apparatus carried by said camera housing and located in the region of said cutout, said flash apparatus including a fixed reflector element located within the said camera housing and behind said cutout and a movable reflector element movable with respect to said fixed reflector element between a collapsed position where said movable element is also located within the camera housing and an expanded position where said movable reflector element extends beyond the exterior surface of said camera housing and forms an extension of said fixed reflector element.

2. In a camera, in combination, a camera housing including front wall means determining the front surface of the camera and having a cutout; and a built-in flash apparatus carried by said camera housing and located in the region of said cutout, said flash apparatus including a fixed reflector element located within said camera housing and behind said cutout and a movable reflector element movable with respect to said fixed reflector element between a collapsed position where said movable element is also located within the camera housing and an expanded position where said movable reflector element extends beyond the exterior surface of said camera housing and forms an extension of said fixed reflector element, said movable reflector element defining with said fixed reflector element, when said movable element is in its expanded position, at least part of an elongated channel-shaped reflector of substantially parabolic cross section.

3. In a camera, in combination, a camera housing having an upper wall and a hollow enclosure carried by said upper wall of said camera housing and defining with said upper wall a chamber which is adapted to contain a unit such as the viewfinder of the camera, said enclosure including a section which is separate from the remainder of said enclosure; connecting means connecting said section of said enclosure to the remainder thereof for movement between a collapsed position where said section of said enclosure forms a continuation of the remainder of said enclosure and an expanded position where said section of said enclosure extends beyond the remainder of said enclosure; and built-in flash apparatus located at least partly within said chamber, said flash apparatus including a fixed reflector element located within said chamber and being stationary with respect to said camera housing and a movable reflector element carried by said section of said enclosure for movement therewith and forming an extension of said fixed reflector element when said section of said enclosure is in said expanded position thereof.

4. In a camera, in combination, a camera housing having an upper wall and a hollow enclosure carried by said upper wall of said camera housing and defining with said upper wall a chamber which is adapted to contain a unit such as the viewfinder of the camera, said enclosure including a section which is separate from the remainder of said enclosure; connecting means connecting said section of said enclosure to the remainder thereof for movement between a collapsed position where said section of said enclosure forms a continuation of the remainder of said enclosure and an expanded position where said section of said enclosure extends beyond the remainder of said enclosure; and built-in flash apparatus located at least partly within said chamber, said flash apparatus including a fixed reflector element located within said chamber and being stationary with respect to said camera housing and a movable reflector element carried by said section of said enclosure for movement therewith and forming an extension of said fixed reflector element when said section of said enclosure is in said expanded position thereof, said section of said enclosure when in said collapsed position thereof closing off both of said reflector elements from the exterior of the camera and when in said expanded position thereof exposing both of said reflector elements.

5. In a camera, in combination, a camera housing having an upper wall and a hollow enclosure carried by said upper wall of said camera housing and defining with said upper wall a chamber which is adapted to contain a unit such as the viewfinder of the camera, said enclosure including a section which is separate from the remainder of said enclosure; connecting means connecting said section of said enclosure to the remainder thereof for movement between a collapsed position where said section of said enclosure forms a continuation of the remainder of said enclosure and an expanded position where said section of said enclosure extends beyond the remainder of said enclosure; and built-in flash apparatus located at least partly within said chamber, said flash apparatus including a fixed reflector element located within said chamber and being stationary with respect to said camera houisng and a movable reflector element carried by said section of said enclosure for movement therewith and forming an extension of said fixed reflector element when said section of said enclosure is in said expanded position thereof, and said flash apparatus including a wall located at one end of said fixed reflector element and carrying a lamp socket.

6. In a camera, in combination, a camera housing having an upper wall and a hollow enclosure carried by said upper wall of said camera housing and defining with said upper wall a chamber which is adapted to contain a unit such as the viewfinder of the camera, said enclosure including a section which is separate from the remainder of said enclosure; connecting means connecting said section of said enclosure to the remainder thereof for movement between a collapsed position where said section of said enclosure forms a continuation of the remainder of said enclosure and an expanded position where said section of said enclosure extends beyond the remainder of said enclosure; and built-in flash apparatus located at least partly within said chamber, said flash apparatus including a fixed reflector element located within said chamber and being stationary with respect to said camera housing and a movable reflector element carried by said section of said enclosure for movement therewith and forming an extension of said fixed reflector element when said section of said enclosure is in said expanded position thereof, said flash apparatus including a support means carried by said section of said enclosure for movement therewith and a lamp socket carried by said support means and adapted to receive a flash lamp.

7. In a camera, in combination, a camera housing having a top wall and a hollow enclosure carried by said top wall of said camera housing and defining with said top wall a chamber which is adapted to contain a unit such as a viewfinder, said enclosure having a rear wall and including a wall portion forming a section of said enclosure which is separate from the remainder of said enclosure; connecting means connecting said wall portion of said enclosure to the remainder thereof for movement between a collapsed position where said wall portion of said enclosure forms an extension of the remainder thereof and an expanded position where said wall portion of said enclosure extends beyond the remainder of said enclosure; and flash apparatus built into and permanently carried by the camera, said flash apparatus being located at least partly within said chamber and including a fixed reflector element which is located within said chamber and a movable reflector element connected to said wall portion for movement therewith and forming an extension of said fixed reflector element when said wall portion is in said expanded position thereof, said fixed reflector element being located, at least in part, forwardly of said rear wall of said enclosure to define a space located between said rear wall of said enclosure and said fixed reflector element, and said flash apparatus including electrical structure at least part of which is located in said space.

8. In a camera, in combination, a camera housing having a top wall and a hollow enclosure carried by said top wall of said camera housing and defining with said top wall a chamber which is adapted to contain a unit such as a viewfinder, said enclosure having a rear wall and including a wall portion forming a section of said enclosure which is separate from the remainder of said enclosure; connecting means connecting said wall portion of said enclosure to the remainder thereof for movement between a collapsed position where said wall portion of said enclosure forms an extension of the remainder thereof and an expanded position where said wall portion of said enclosure extends beyond the remainder of said enclosure; and flash apparatus built into and permanently carried by the camera, said flash apparatus being located at least partly within said chamber and including a fixed reflector element which is located within said chamber and a movable reflector element connected to said wall portion for movement therewith and forming an extension of said fixed reflector element when said wall portion is in said expanded position thereof, said movable reflector element defining a predetermined space with said wall portion of said enclosure and said flash apparatus including electrical structure at least part of which is located in said space.

9. In a camera, in combination, a camera housing having an upper wall and a hollow enclosure carried by said upper wall of said camera housing and defining therewith a chamber adapted to contain a unit such as a viewfinder, said enclosure including a section separate from the remainder of said enclosure; connecting means connecting said section of said enclosure to the remainder thereof for movement between a collapsed position where said section forms a continuation of the remainder of said enclosure and an expanded position where said section extends beyond the remainder of said enclosure, said section of said enclosure carrying a housing which is movable with said section; a stationary reflector element located in said chamber and a movable reflector element carried by said section of said enclosure for movement therewith and forming an extension of said stationary reflector element when said section is in said expanded position thereof, and a flash apparatus located at least partly within said chamber, formed in part by said reflector elements, and including electrical structure at least part of which is located within the housing which is connected to said section of said enclosure for movement with said section.

10. In a camera, in combination, a camera housing having an upper wall and a hollow enclosure carried by said upper wall and defining therewith a chamber adapted to contain a unit such as a viewfinder, said enclosure having a top wall, front and rear walls, and a pair of end walls, at least two of said enclosure walls which adjoin each other respectively having adjoining portions separate from the remainder of said enclosure walls and forming a section of said enclosure; means connecting one of said wall portions along an edge thereof turnably to the remainder of said enclosure for connecting said section of said enclosure for turning movement with respect to the remainder thereof between a collapsed position where said enclosure section forms a continuation of the remainder thereof and an expanded position where said enclosure section extends beyond the remainder thereof; and flash apparatus at least partly located within said chamber and including a fixed reflector element located in said chamber and a movable reflector element connected to said enclosure section for movement therewith and forming an extension of said fixed reflector element when said enclosure section is in said expanded position thereof.

11. In a camera, in combination, a camera housing having an upper wall and a hollow enclosure carried by said upper wall and defining therewith a chamber adapted to contain a unit such as a viewfinder, said enclosure having a top wall, front and rear walls, and a pair of end walls, at least two of said enclosure walls which adjoin each other respectively having adjoining portions separate from the remainder of said enclosure walls and forming a section of said enclosure; means connecting one of said wall portions along an edge thereof turnably to the remainder of said enclosure for connecting said section of said enclosure for turning movement with respect to the remainder thereof between a collapsed position where said enclosure section forms a continuation of the remainder thereof and an expanded position where said enclosure section extends beyond the remainder thereof; and flash apparatus at least partly located within said chamber and including a fixed reflector element located in said chamber and a movable reflector element connected to said enclosure section for movement therewith and forming an extension of said fixed reflector element when said enclosure section is in said expanded position thereof, said flash apparatus also including electrical structure carried by said section of said enclosure for movement therewith, and said connecting means being in the form of a hinge which is hollow and through which electrical leads extend for electrically interconnecting the part of the electrical structure of the flash apparatus which is carried by said section of said enclosure with the part of the flash apparatus which remains in said chamber.

12. In a camera, in combination, a camera housing having an upper wall and a hollow enclosure carried by said upper wall and defining therewith a chamber adapted to contain a unit such as a viewfinder, said enclosure having a top wall, front and rear walls, and a pair of end walls, at least two of said enclosure walls which adjoin each other respectively having adjoining portions separate from the remainder of said enclosure walls and forming a section of said enclosure; means connecting one of said wall portions along an edge thereof turnably to the remainder of said enclosure for connecting said section of said enclosure for turning movement with respect to the remainder thereof between a collapsed position where said enclosure section forms a continuation of the remainder thereof and an expanded position where said enclosure section extends beyond the remainder thereof; flash apparatus at least partly located within said chamber and including a fixed reflector element located in said chamber and a movable reflector element connected to said enclosure section for movement therewith and forming an extension of said fixed reflector element when said enclosure section is in said expanded position thereof; and spring means urging said section of said enclosure to said expanded position thereof.

13. In a camera, in combination, a camera housing having an upper wall and a hollow enclosure carried by said upper wall and defining therewith a chamber adapted to contain a unit such as a viewfinder, said enclosure having a top wall, front and rear walls, and a pair of end walls, at least two of said enclosure walls which adjoin each other respectively having adjoining portions separate from the remainder of said enclosure walls and forming a section of said enclosure; means connecting one of said wall portions along an edge thereof turnably to the remainder of said enclosure for connecting said section of said enclosure for turning movement with respect to the remainder thereof between a collapsed position where said enclosure section forms a continuation of the remainder thereof and an expanded position where said enclosure section extends beyond the remainder thereof; flash apparatus at least partly located within said chamber and including a fixed reflector element located in said chamber and a movable reflector element connected to said enclosure section for movement therewith and forming an extension of said fixed reflector element when said enclosure section is in said expanded position thereof; spring means urging said section of said enclosure to said expanded position thereof; and manually operable, releasable catch means carried by said enclosure and operatively connected with said section thereof for releasably maintaining said section in opposition to said spring means in said collapsed position, whereby said catch means can be manipulated by the operator to release said section of said enclosure to said spring means to be moved thereby to said expanded position.

14. In a camera, in combination, a camera housing having an upper wall; a hollow enclosure carried by said upper wall and defining therewith a chamber which is adapted to contain a unit such as a viewfinder, said enclosure having a section separate from the remainder of said enclosure; connecting means connecting said section of said enclosure to the remainder thereof for movement with respect thereto between a collapsed position where said section of said enclosure forms a continuation of the remainder thereof and an expanded position where said section of said enclosure extends beyond the remainder of said enclosure; flash apparatus located at least in part in said chamber and including a fixed reflector element located in said chamber and a movable reflector element carried by said enclosure section for movement therewith and forming an extension of said fixed reflector element when said section of said enclosure is in said expanded position thereof; and releasable holding means operatively connected to said section of said enclosure for releasably holding the latter in said collapsed and expanded positions thereof.

15. In a camera, in commbination, a camera housing having an upper wall; a hollow enclosure carried by said upper wall and defining therewith a chamber which is adapted to contain a unit such as a viewfinder, said enclosure having a section separate from the remainder of said enclosure; connecting means connecting said section of said enclosure to the remainder thereof for movement with respect thereto between a collapsed position where said section of said enclosure forms a continuation of the remainder thereof and an expanded position where said section of said enclosure extends beyond the remainder of said enclosure; flash apparatus located at least in part in said chamber and including a fixed reflector element located in said chamber and a movable reflector element carried by said enclosure section for movement therewith and forming an extension of said fixed reflector element when said section of said enclosure is in said expanded position thereof, said flash apparatus including a wall located at an end of said fixed reflector element and carrying a lamp socket; and manually operable ejector means carried by said enclosure and operatively connected to said socket for ejecting a lamp therefrom.

16. In a camera, in combination, a camera housing including front wall means defining the front surface of the camera and having a cutout; and flash apparatus built into the camera and carried by said camera housing in the region of said cutout in said front wall, said flash apparatus including a stationary reflector element located within said camera housing and behind said cutout, guide means carried by said camera housing, and a movable reflector element guided by said guide means for movement between a collapsed position where said movable reflector element is located within the camera housing and an expanded position where said movable reflector extends beyond the exterior surface of said camera housing and forms an extension of said stationary reflector element.

17. In a camera, in combination, a camera housing including front wall means defining the front surface of the camera and having a cutout; and flash apparatus built into the camera and carried by said camera housing behind said cutout in said front wall, said apparatus including a stationary reflector element located within said camera housing and behind said cutout, guide means, and a flexible sheet forming a movable reflector element and guided by said guide means for movement between a collapsed position located within the camera housing and an expanded position where said movable reflector element extends beyond the exterior surface of said camera housing and forms an extension of said stationary reflector element.

18. In a camera, in combination, a camera housing including front wall means, said front wall means defining the front surface of the camera, said front wall means also defining an opening located at the exterior of the camera; and flash apparatus built into the camera in the region of said opening and carried by said camera housing, said flash apparatus including a stationary reflector element located in said opening defined by said front wall means and a movable reflector element carried by said camera housing for movement between a collapsed position where said movable reflector element at least partly covers said opening and is located within the camera housing and an expanded position where said movable reflector element extends beyond the exterior surface of the camera housing and forms an extension of said stationary reflector element.

19. In a camera, in combination, a camera housing including front wall means defining the front surface of the camera, said wall means also defining an opening at an upper portion of the camera; and flash apparatus built into the camera in the region of said opening and carried by said camera housing, said flash apparatus including a stationary reflector element of elongated, channel-shaped configuration located in said opening and a wall located at an end of said stationary reflector element and carrying a lamp socket means for supporting an elongated flash lamp in a position extending in the same direction as the elongated stationary reflector element, and a movable reflector element carried by said camera housing for movement between a collapsed position located within the camera housing and an expanded position extending beyond the exterior surface of said camera housing and forming a continuation of said stationary reflector element.

20. In a camera, in combination, a camera housing including front wall means defining the front surface of the camera and having a cutout; and flash apparatus built into the camera and carried by said camera housing behind said cutout in said front wall, said flash apparatus including a stationary reflector element located within said camera housing and behind said cutout and a movable reflector element supported for movement by said camera housing between collapsed position also located within the camera housing and an expanded position extending beyond the exterior surface of said camera housing and forming an extension of said stationary reflector element, said movable reflector element when in said collapsed position thereof defining with said stationary reflector element a space which is large enough to accommodate a flash lamp.

21. In a camera, in combination, a camera housing including front wall means defining the front surface of the camera and raving a cutout; and flash apparatus built into the camera and carried by said camera housing behind said cutout in said front wall, said flash apparatus including a stationary reflector element located within said camera housing and behind said cutout and a movable reflector element, and said flash apparatus including guide means carried by said camera housing and defining guiding grooves, said movable reflector element being in the form of a sheet having side edges guided in said grooves and cooperating therewith for guiding said sheet for movement between a collapsed position where said movable reflector element is located within the camera housing and an expanded position where said movable reflector element extends beyond the exterior surface of said camera housing and forms an extension of said stationary reflector element.

22. In a camera, in combination, a camera housing including front wall means defining the front surface of the camera and having a cutout; and flash apparatus built into the camera in the region of said cutout in said front wall and carried by said camera housing, said flash apparatus including a stationary reflector element located within said camera housing and behind said cutout and a movable reflector element, and said flash apparatus including guide means carried by said camera housing and defining guiding grooves, said movable reflector element being in the form of a sheet having side edges guided in said grooves and cooperating therewith for guiding said sheet for movement between a collapsed position where said movable reflector element is located within the camera housing and an expanded position where said movable reflector element extends beyond the exterior surface of said camera housing and forms an extension of said stationary reflector element, said grooves being located behind said stationary reflector element and said movable reflector element being located behind said stationary element when said movable element is in said collapsed position thereof.

23. In a camera, in combination, a camera housing including front wall means defining the front surface of the camera and having a cutout; and flash apparatus built into the camera and carried by said camera housing behind said cutout in said front wall, said flash apparatus including a stationary reflector element located within said camera housing and behind said cutout and a pair of movable reflector elements movably carried by said camera housing for movement between a collapsed position located within the camera housing and an expanded position extending beyond the exterior surface of said camera housing and forming extensions, respectively, of said stationary reflector element.

24. In a camera, in combination, a camera housing including front wall means defining the front surface of the camera and having a cutout; and flash apparatus built into the camera and carried by said camera housing behind said cutout in said front wall, said flash apparatus including a stationary reflector element located within said camera housing and behind said cutout, guide means carried by said camera housing and defining guiding grooves located behind said stationary reflector element and conforming generally to the configuration thereof, and a pair of flexible sheets guided in said grooves for movement between a collapsed position located within the camera housing and expanded positions extending beyond the exterior surface of the camera housing and respectively forming extensions of said stationary reflector element.

25. In a camera, in combination, a camera housing including front wall means defining the front surface of the camera and having a cutout; and flash apparatus built into the camera in the region of said cutout in said front wall and carried by said camera housing, said flash apparatus including an elongated stationary reflector element located within said camera housing and behind said cutout, a pair of end walls fixed to and located respectively at the ends of said stationary reflector element, said pair of end walls respectively being formed with elongated grooves having, respectively, upper portions located over said stationary reflector element, at the ends thereof, and rear portions extending downwardly from said upper portions, and said end walls being formed with notches extending to the exterior surface of the camera housing upwardly from said grooves at the junctions between said upper and rear portions thereof, and said flash apparatus including a movable reflector element in the form of a flexible sheet having side edges guided in said grooves, said sheet being guided for movement between an expanded position extending from said rear portions of said grooves through said notches beyond the camera housing and forming an extension of said stationary reflector element and a collapsed position extending from said rear portions of said grooves along said upper portions thereof and at least partly covering said stationary reflector element.

26. In a camera, in combination, a camera housing including front wall means defining the front surface of the camera and having a cutout; rear wall means spaced from said front wall means; and flash apparatus built into the camera and carried by said camera housing and located in the region of said cutout, said flash apparatus including a stationary reflector element located forwardly of said rear wall means within said camera housing and behind said cutout and defining a space with said rear wall means and a movable reflector element carried by said camera housing for movement between a collapsed position located within the camera housing and an expanded position extending beyond the exterior surface of said camera housing and forming a continuation of said stationary reflector element, and said flash apparatus including electrical structure at least part of which is located in said space.

References Cited by the Examiner

UNITED STATES PATENTS

| | | | |
|---|---|---|---|
| 1,406,452 | 2/22 | Evans | 240—10.67 |
| 2,876,338 | 3/59 | Seligson | 240—1.3 |
| 2,913,569 | 11/59 | Edelstein | 240—10.6 X |
| 2,976,398 | 3/61 | McKee | 240—1.3 |
| 3,001,461 | 9/61 | Irwin | 240—1.3 X |

FOREIGN PATENTS

| | | |
|---|---|---|
| 217,297 | 9/61 | Austria. |
| 875,469 | 8/61 | Great Britain. |

NORTON ANSHER, *Primary Examiner.*